US009242832B2

(12) United States Patent
Word et al.

(10) Patent No.: US 9,242,832 B2
(45) Date of Patent: Jan. 26, 2016

(54) HAND-CARRIED TAPING MACHINE WITH NON-POWERED GUIDE SYSTEM

(71) Applicant: General Electric Company, Schenectady, NY (US)

(72) Inventors: Jacob Wade Word, Simpsonville, SC (US); Adam Scott Carberry, Pittsburgh, PA (US); Richard Michael Hatley, Morristown, NJ (US); Michael Steven Olle, Kennesaw, GA (US)

(73) Assignee: General Electric Company, Schenectady, NY (US)

( * ) Notice: Subject to any disclaimer, the term of this patent is extended or adjusted under 35 U.S.C. 154(b) by 127 days.

(21) Appl. No.: 14/046,246

(22) Filed: Oct. 4, 2013

(65) Prior Publication Data

US 2015/0096688 A1    Apr. 9, 2015

(51) Int. Cl.
*B29C 65/00* (2006.01)
*B29C 73/00* (2006.01)
(Continued)

(52) U.S. Cl.
CPC ................ *B65H 81/00* (2013.01); *B29C 70/30* (2013.01); *B29C 70/54* (2013.01); *B65H 54/2896* (2013.01); *B65H 57/14* (2013.01); *B65H 79/00* (2013.01); *B65H 81/02* (2013.01); *B65H 81/04* (2013.01); *B65H 81/06* (2013.01); *B65H 81/08* (2013.01); *B65B 27/10* (2013.01); *B65B 27/105* (2013.01); *B65C 3/02* (2013.01); *B65H 2403/30* (2013.01); *B65H 2403/40* (2013.01); *B65H 2404/10* (2013.01); *B65H 2701/37* (2013.01); *H01B 13/01281* (2013.01); *H01B 13/08* (2013.01); *H01B 13/0808* (2013.01); *H01B 13/0816* (2013.01); *H01B 13/0825* (2013.01); *H01B 13/0833* (2013.01)

(58) Field of Classification Search
CPC .................... H01B 13/01281; H01B 13/0816; H01B 13/0833; H01B 13/06; H01B 13/08; B65B 27/10; Y10T 156/1795; B65H 81/08; B65H 81/06; B65H 81/02; B65H 81/00; B65H 79/00; B65H 2404/10; B65H 2403/30; B65H 2403/40; B29C 70/54; B29C 70/30
See application file for complete search history.

(56) References Cited

U.S. PATENT DOCUMENTS 3,031,368 A * 4/1962 Zent ...................... B65B 27/105 156/443
3,853,667 A * 12/1974 Polshikov et al. ............ 156/422
(Continued)

FOREIGN PATENT DOCUMENTS

EP 0542862 B1 9/1996
FR 2588254 A1 * 4/1987
JP 57057165 A 4/1982

*Primary Examiner* — Alex Efta
(74) *Attorney, Agent, or Firm* — Hoffman Warnick LLC; Ernest G. Cusick

(57) ABSTRACT

A hand-carried taping machine for taping an elongated object is disclosed. The machine includes a powered gear set operably coupled to a body and powered by a drive system. An applicator head includes a substantially C-shaped gear in meshing engagement with the powered gear set such that the substantially C-shaped gear rotates about an application axis under control of the drive system, and a tape reel mount for rotatably mounting a reel of tape on the substantially C-shaped gear for rotation about the application axis and application of the tape to the elongated object. A non-powered guide system operably couples to the body for guiding the applicator head along the elongated object with transient engagement with the elongated object such that the elongated object is maintained in a vicinity of the reel of tape.

20 Claims, 9 Drawing Sheets

(51) Int. Cl.

| | |
|---|---|
| ***B65H 81/00*** | (2006.01) |
| ***B29C 70/30*** | (2006.01) |
| ***B29C 70/54*** | (2006.01) |
| ***B65H 81/08*** | (2006.01) |
| ***B65H 81/04*** | (2006.01) |
| ***B65H 81/06*** | (2006.01) |
| ***B65H 81/02*** | (2006.01) |
| ***B65H 79/00*** | (2006.01) |
| ***B65H 54/28*** | (2006.01) |
| ***B65H 57/14*** | (2006.01) |
| *B65B 27/10* | (2006.01) |
| *B65C 3/02* | (2006.01) |
| *H01B 13/012* | (2006.01) |
| *H01B 13/08* | (2006.01) |

(56) References Cited

U.S. PATENT DOCUMENTS 3,985,311 A 10/1976 Stuart
4,008,114 A 2/1977 Lindsey
4,070,227 A 1/1978 Stuart
4,086,117 A 4/1978 Pearsall
4,264,398 A 4/1981 Pruitt
4,346,550 A * 8/1982 Ferree ................ H01B 13/0808 242/439.5
4,707,214 A 11/1987 Nithart et al.
4,790,896 A * 12/1988 Schmalholtz .... H01B 13/01281 100/13
4,982,560 A 1/1991 Vives et al.
5,314,565 A 5/1994 Moore
5,355,787 A 10/1994 Burns et al.
5,491,880 A * 2/1996 Labiche .................. B29C 63/10 156/282
5,573,627 A * 11/1996 Vuong .................... B65B 27/10 156/392
5,875,618 A * 3/1999 Sodies .................. B65B 27/105 156/468
5,954,918 A 9/1999 Belivakici
6,789,380 B2 * 9/2004 Mellott et al. .................... 57/10
7,905,266 B2 * 3/2011 Sugiyama ............... B65B 27/06 156/425
8,256,482 B2 9/2012 Brosseau et al.
8,783,318 B2 * 7/2014 Witkiewicz ............... B65C 3/02 100/27
2004/0211522 A1 * 10/2004 Fries ......................... B65C 3/02 156/443

* cited by examiner

HAND-CARRIED TAPING MACHINE WITH NON-POWERED GUIDE SYSTEM

BACKGROUND OF THE INVENTION

The disclosure relates generally to taping machines, and more particularly, to a hand-carried taping machine including a non-powered guide system.

Applying tape to an object is performed for a number of reasons. Various automated tape applying machines, some of which are hand-carried, exist for taping various objects. One illustrative industrial taping operation that is typically performed by hand, however, includes taping the rotor end windings of a generator with insulating (e.g., fiberglass) tape. The end windings, while having a uniform cross-section, typically have an extensive length that curves at different degrees of severity along its length. The end windings are typically too large or clumsy to move. In this setting, the inability to control overlap/placement of the tape with current hand held taping machines while also allowing degrees of motion/freedom to wrap non-linear paths prevents the use of the machines. Consequently, while taping machines are advantageous, where the object to be taped is large or of non-uniform shape, the taping operation is oftentimes performed by hand. In terms of generator end windings, the hand taping operation is a labor intensive process that is often on the critical path of the work to be completed. Adding to the complexity is that certain types of generator end windings are less common than others, creating a steeper learning curve to become proficient at this manual method of insulating. Additionally, the fiberglass insulation tape can occasionally be a mild skin irritant, thus requiring the wearing of gloves which can make handling the tape more difficult.

BRIEF DESCRIPTION OF THE INVENTION

A first aspect of the disclosure provides a hand-carried taping machine for taping an elongated object, the hand-carried taping machine comprising: a body defining an opening to one side of the body that extends in an outward direction from a closed inner end, wherein an application axis extends generally perpendicular to the outward direction of the opening in the body; a powered gear set operably coupled to the body and powered by a drive system; an applicator head including a substantially C-shaped gear in meshing engagement with the powered gear set such that the substantially C-shaped gear rotates about the application axis under control of the drive system, and a tape reel mount for rotatably mounting a reel of tape on the substantially C-shaped gear for rotation about the application axis and application of the tape to the elongated object; and a non-powered guide system operably coupled to the body for guiding the applicator head along the elongated object with transient engagement with the elongated object such that the elongated object is maintained in a vicinity of the reel of tape.

A second aspect of the disclosure provides a hand-carried taping machine for taping an elongated object, the hand-carried taping machine comprising: a body defining an opening to one side of the body that extends in an outward direction from a closed inner end, wherein an application axis extends generally perpendicular to the outward direction of the opening in the body; a powered gear set operably coupled to the body and powered by a drive system; an applicator head including: a substantially C-shaped gear in meshing engagement with the powered gear set such that the substantially C-shaped gear rotates about the application axis under control of the drive system, a tape reel mount for rotatably mounting a reel of tape on the substantially C-shaped gear for rotation about the application axis and application of the tape to the elongated object, wherein the tape reel mount includes a substantially C-shaped mounting plate coupled to the substantially C-shaped gear; a plurality of rolling bearings mounted to the body about the opening in the body, wherein the substantially C-shaped mounting plate includes a bearing surface for engagement with the plurality of rolling bearings; and non-powered guide system operably coupled to the body for guiding the applicator head along the elongated object with transient engagement with the elongated object such that the elongated object is maintained in a vicinity of the reel of tape.

A third aspect of the disclosure provides a hand-carried taping machine for taping an elongated object, the hand-carried taping machine comprising: a body defining an opening to one side of the body that extends in an outward direction from a closed inner end, wherein an application axis extends generally perpendicular to the outward direction of the opening in the body; a powered gear set operably coupled to the body and powered by a drive system; an applicator head including a substantially C-shaped gear in meshing engagement with the powered gear set such that the substantially C-shaped gear rotates about the application axis under control of the drive system, and a tape reel mount for rotatably mounting a reel of tape on the substantially C-shaped gear for rotation about the application axis and application of the tape to the elongated object; and a non-powered guide system operably coupled to the body, the non-powered guide system including a plurality of rollers for transient rolling engagement with the elongated object for guiding the applicator head along the elongated object with transient engagement with the elongated object such that the elongated object is maintained in a vicinity of the reel of tape.

The illustrative aspects of the present disclosure are designed to solve the problems herein described and/or other problems not discussed.

BRIEF DESCRIPTION OF THE DRAWING

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated above, the disclosure provides a hand-carried taping machine with a non-powered guide system. The hand-carried taping machine provides the ability to control overlap/placement of the tape with a hand held device while also allowing degrees of motion/freedom to wrap non-linear paths.

Figure 1:
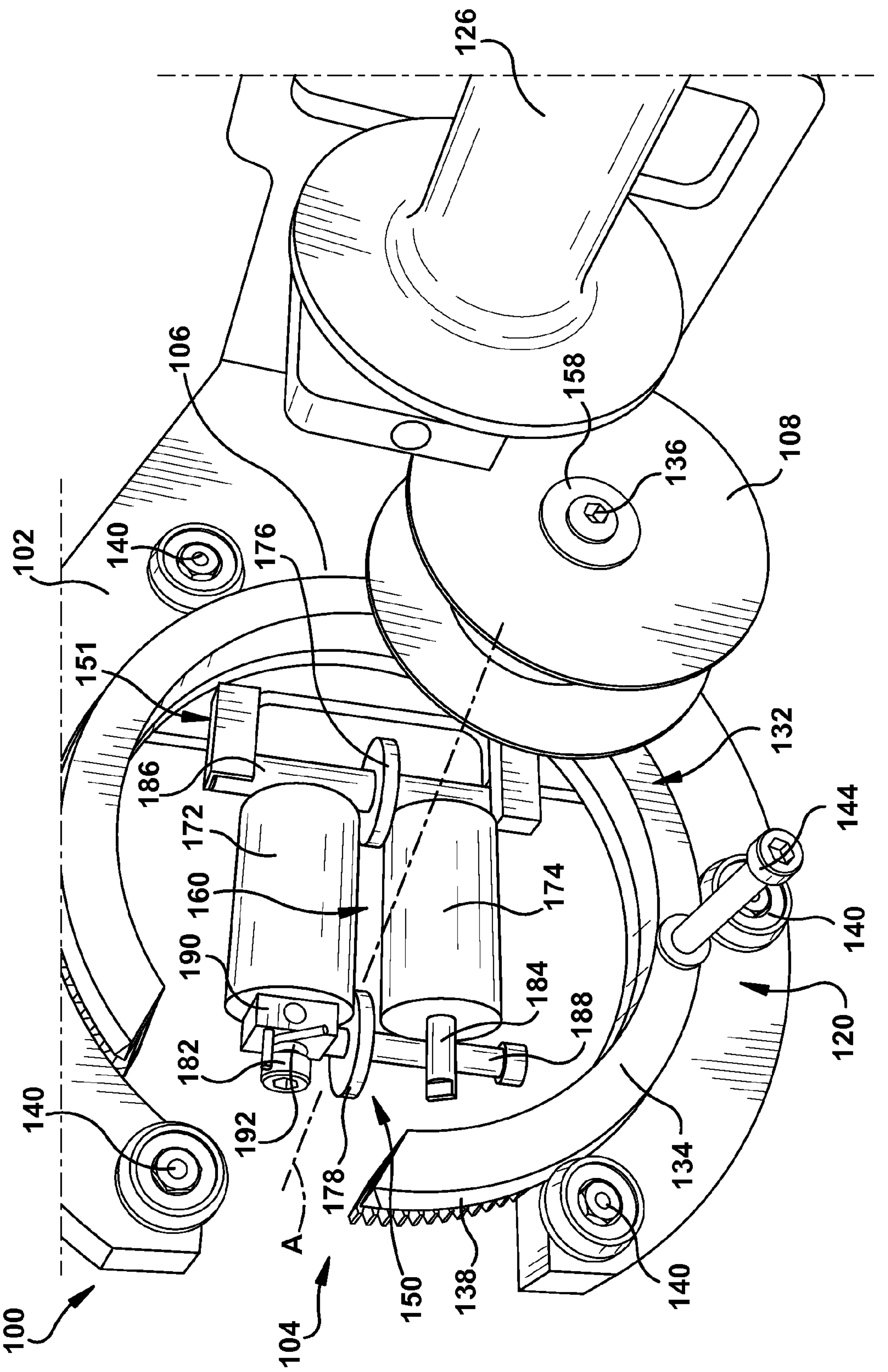
FIG. 1 shows a front perspective view of a hand-carried taping machine with a non-powered guide system according to embodiments of the invention.
Figure 5:
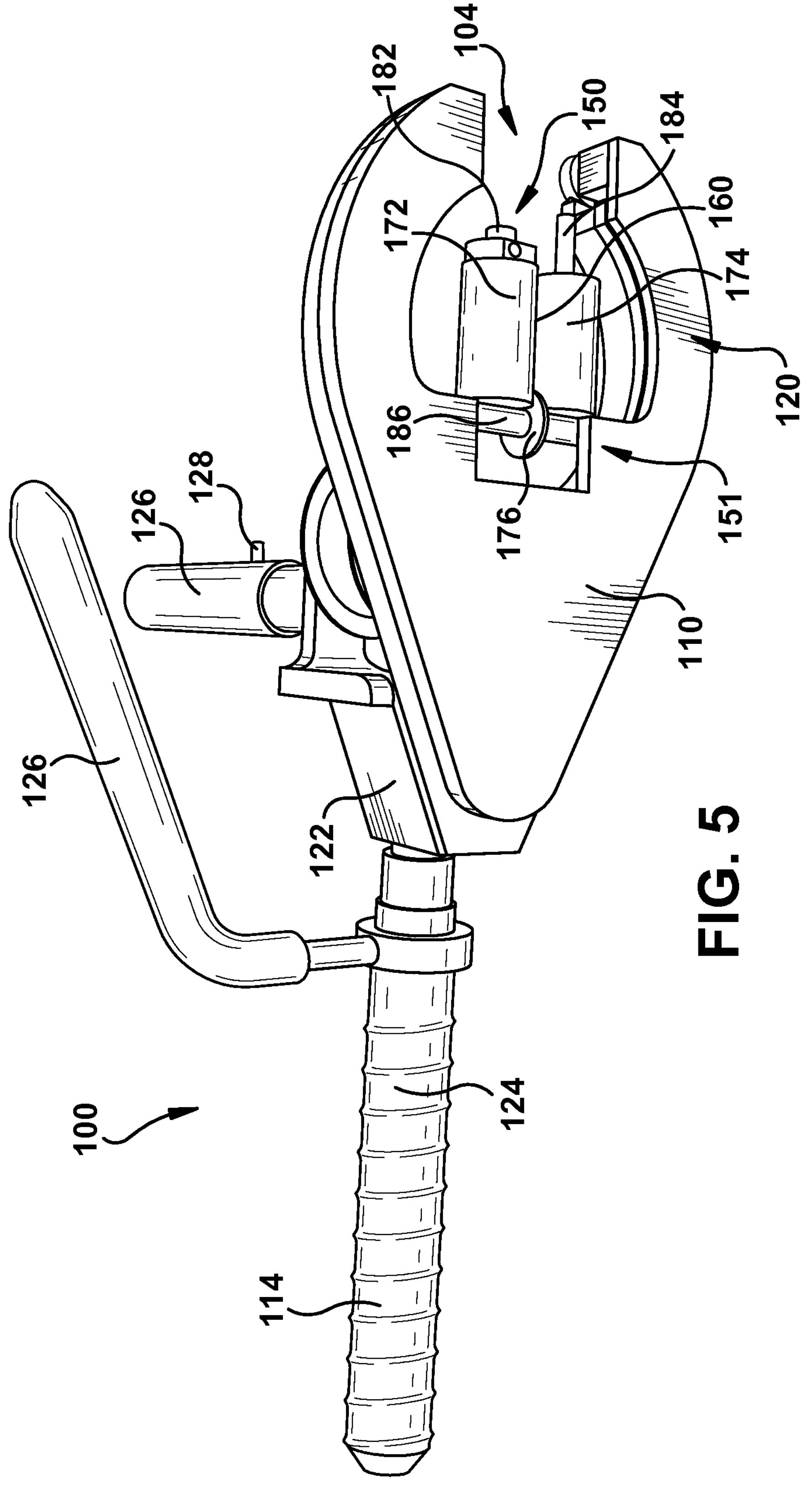
FIG. 5 shows a rear-top perspective view of a hand-carried taping machine with a three roller non-powered guide system according to embodiments of the invention.
Figure 6:
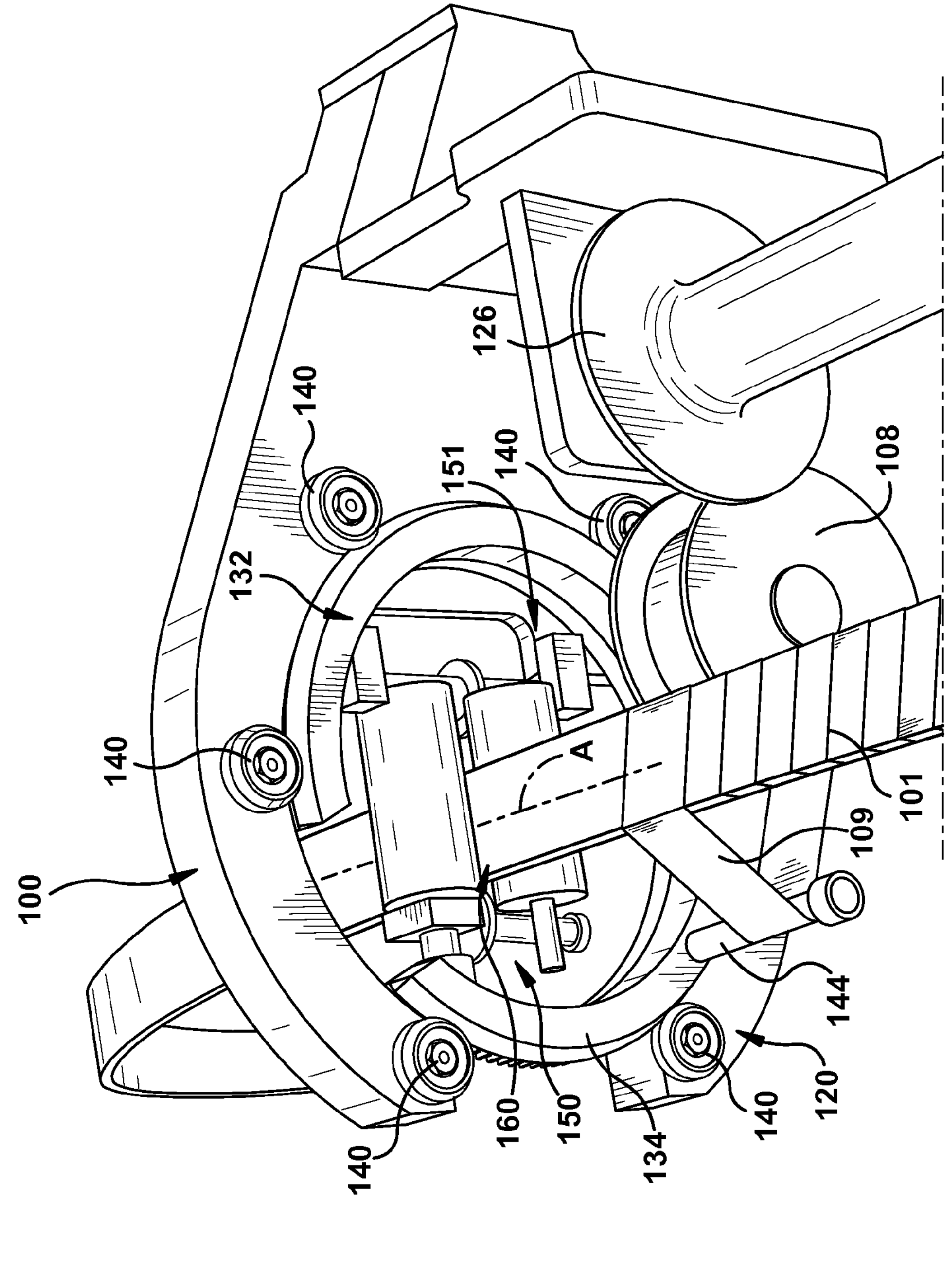
FIG. 6 shows a top perspective view of the hand-carried taping machine in operation according to embodiments of the invention.
Figure 7:
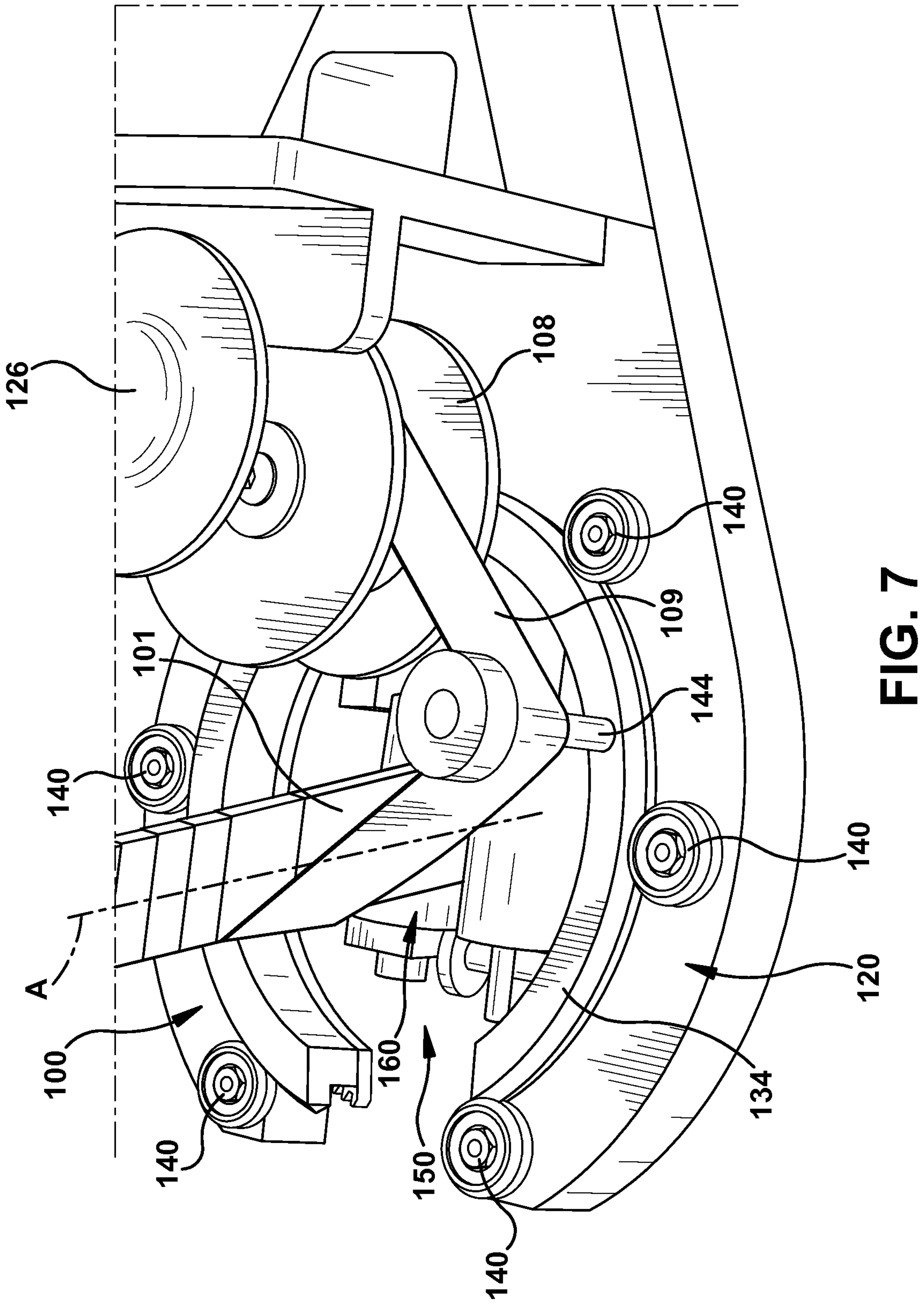
FIG. 7 shows a lower perspective view of the hand-carried taping machine in operation according to embodiments of the invention.

Referring to FIG. 1, a front perspective view of a hand-carried taping machine 100 for taping an elongated object 101 (FIGS. 6-7) according to embodiments of the invention is illustrated. Hand-carried taping machine 100 generally includes a body 102, a powered gear set 112 (FIG. 2 only), a drive system 114 (FIGS. 2, 4 and 5), an applicator head 120 for deploying a tape from a reel of tape 108, and a non-powered guide system 150. Taping machine 100 is "hand-carried" in that its weight is carried by a user excepting any weight supported by elongated object 101 to be taped, i.e., there are no overhead or table support systems and the machine is highly portable. In FIGS. 6 and 7, elongated object 101 has been illustrated as a copper end winding that has substantially flattened rectangular cross-section, and curves at different degrees of severity along its length. As will be apparent, the teachings of the invention are not limited to objects having that particular shape or dimensions.

As illustrated in FIG. 1, body 102 defines an opening 104 to one side of the body such that the opening extends in an outward direction from a closed inner end 106 of body 102. An application axis A extends generally perpendicular to the outward direction of opening 104 in body 102. Application axis A is so named as it indicates, generally, the path upon which the machine travels over an object (not shown in FIG. 1) during taping operations in the vicinity of a reel of tape 108 from which tape 109 (FIGS. 6-7) is deployed. Body 102 may be constructed from any now known or later developed material, e.g., steel, stainless steel, steel alloy, nickel, plastic, reinforced plastic, etc., having sufficient strength to withstand operation.

Figure 2:
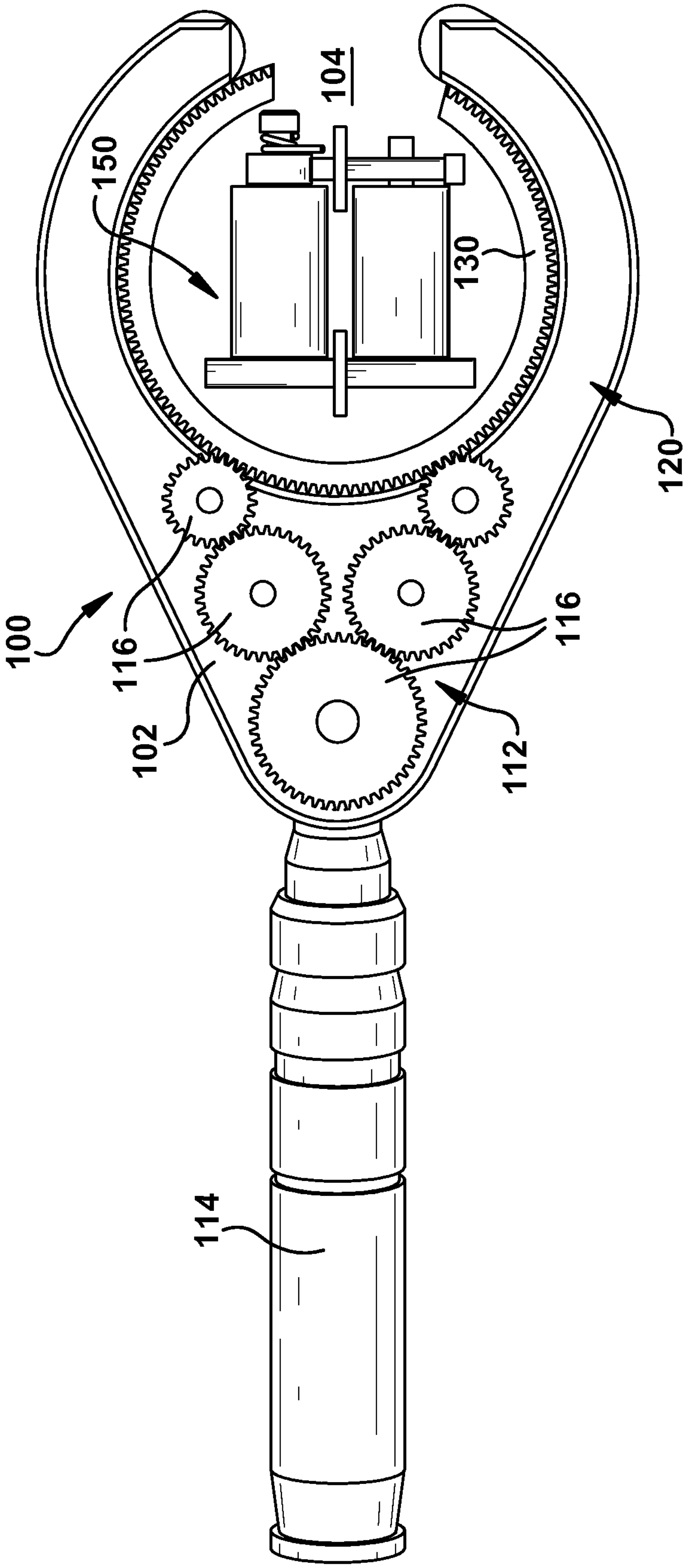
FIG. 2 shows a rear view of a hand-carried taping machine with an enclosure removed according to embodiments of the invention.

FIG. 2 shows a rear view of hand-carried taping machine 100 in which an enclosure 110 (FIG. 5) of body 102 has been removed to reveal powered gear set 112, which is operably coupled to body 102 and powered by a drive system 114. Powered gear set 112 may include any number of meshing gears 116 for transmitting rotational power from drive system 114 to a substantially C-shaped gear 130 of applicator head 120. As illustrated, five gears of various sizes are shown rotationally coupled to body 102, e.g., via posts on body 102 or other rotational mounting systems. Drive system 114 may include any now known or later developed drive system capable of being hand-carried, and ideally handheld. The power source may be, for example, electric, pneumatic, hydraulic, etc. In one embodiment, as illustrated in FIGS. 4-5, drive system 114 may include a right-angle drive 122 (enclosed within body 102) capable of providing rotational power at a right angle to a handle or body 124 thereof. Alternatively, where drive system 114 provides rotational power about a longitudinal axis thereof, powered gear set 112 may provide gearing capable of converting the power transmission to an angle compatible with the rest of powered gear set 112. Drive system 114 may provide a first handle 124 for an operator, and at least one second handle 126 extending at an angle relative to the first handle. Second handle(s) 126 may extend substantially perpendicular to first handle 124 as shown in FIGS. 1, 3-5, and/or at an oblique angle, as shown in FIGS. 4-5. In any event, handles 124, 126 provide a system from which an operator can safely hold and manipulate hand-carried taping machine 100 into any position necessary to properly tape, e.g., in a neat, overlapping fashion, an object to be taped. An on/off switch 128 (FIGS. 4-5) may be provided for drive system 114 on any handle 124, 126 or any other convenient position on hand-carried taping machine 100. Drive system 114 may operate at multiple, adjustable speeds such that the deployment of tape 109 can be better controlled.

Figure 3:
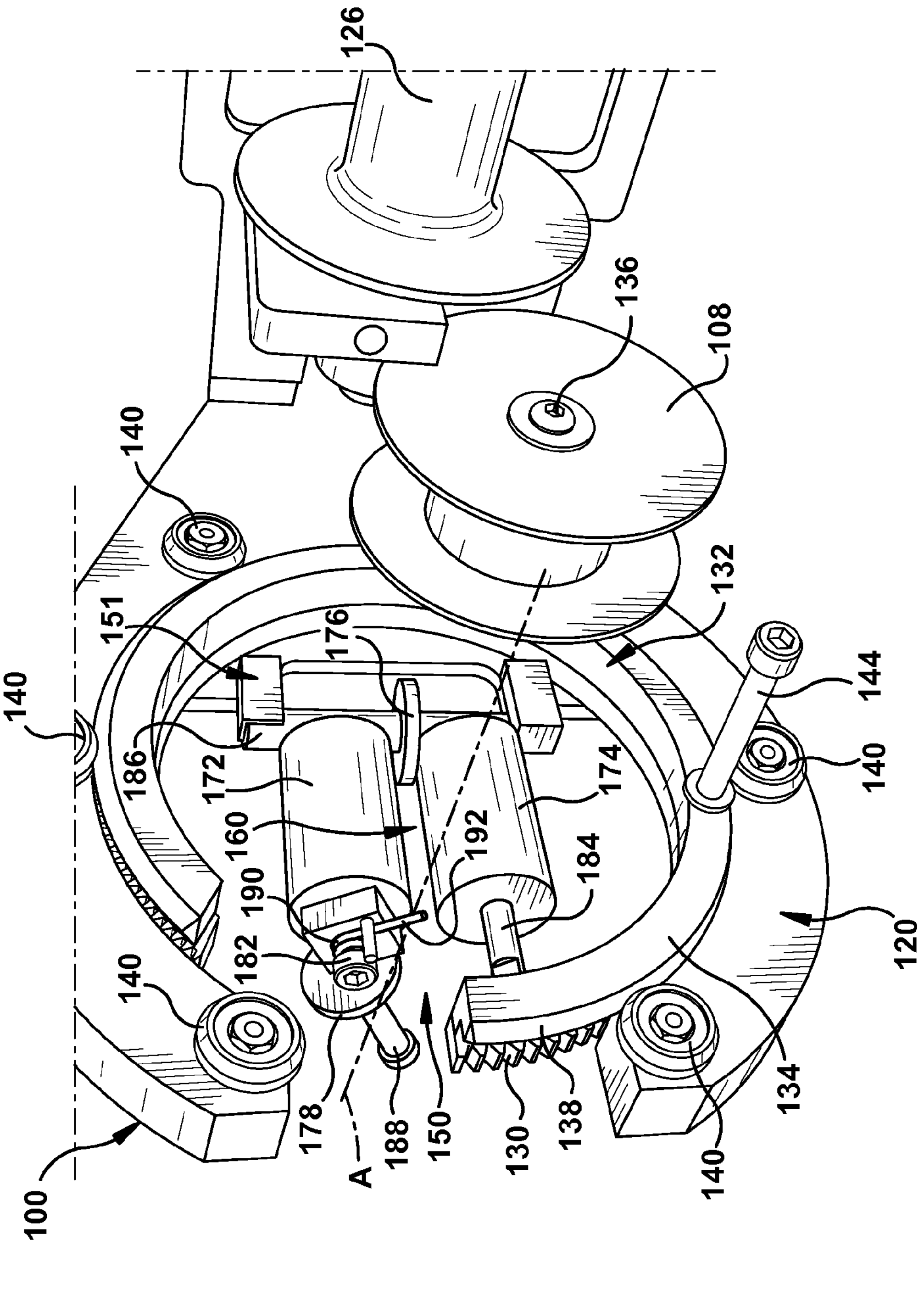
FIG. 3 shows a front perspective view of the hand-carried taping machine of FIG. 1 in an open position of the guide system according to embodiments of the invention.
Figure 4:
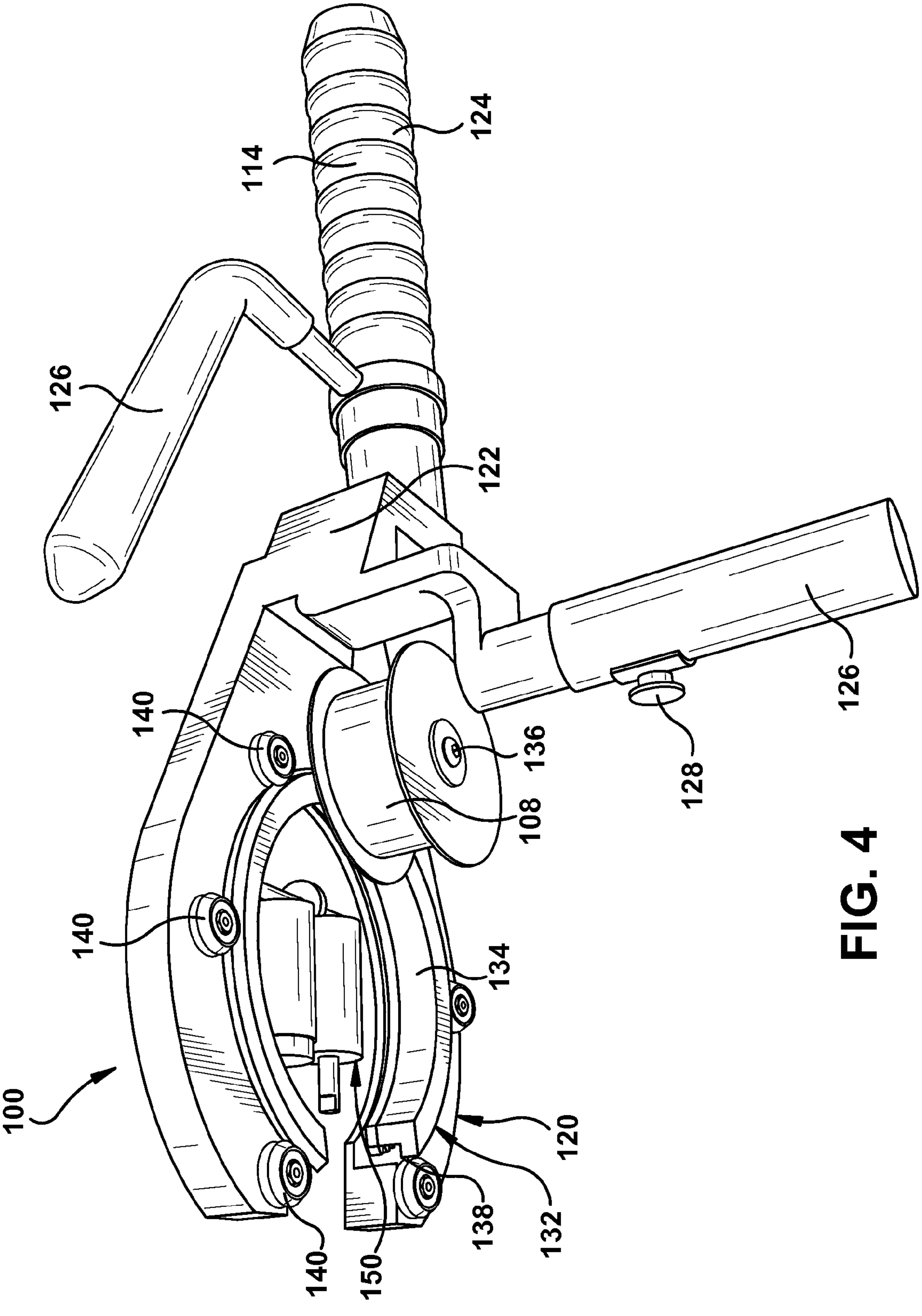
FIG. 4 shows a front-top perspective view of a hand-carried taping machine with an additional handle according to embodiments of the invention.

Turning to FIGS. 2 and 3, applicator head 120 may include a substantially C-shaped gear 130 in meshing engagement with powered gear set 112 such that substantially C-shaped gear 130 rotates about application axis A under control of drive system 114. Applicator head 102 also includes a tape reel mount 132 for rotatably mounting reel of tape 108 on substantially C-shaped gear 130 for rotation about application axis A and application of tape 109 to elongated object 101 (FIGS. 6-7). In one embodiment, tape reel mount 132 includes a substantially C-shaped mounting plate 134 coupled to substantially C-shaped gear 130 and a tape reel supporting post 136 coupled to the substantially C-shaped mounting plate for rotatably supporting reel of tape 108. Substantially C-shaped mounting plate 134 may be coupled to C-shaped gear 130 in any now known or later developed manner, e.g., welding, bolts, rivets, etc. Substantially C-shaped mounting plate 134 may include a bearing surface 138 (shown best in FIG. 4) for engagement with a plurality of rolling bearings 140. As shown in FIGS. 1 and 3-7, plurality of rolling bearings 140 may be mounted to body 102 about opening 104 in the body so as to support tape reel mount 134. More specifically, bearing surface 138 engages with plurality of rolling bearings 140 to allow rotation of tape reel mount 132 via power from C-shaped gear 130 for rotation about application axis A. Although six rolling bearings 140 have been illustrated on body 102 about opening 104 (one is behind tape reel 108), any number capable of supporting tape reel mount 132 may be employed.

Figure 8:
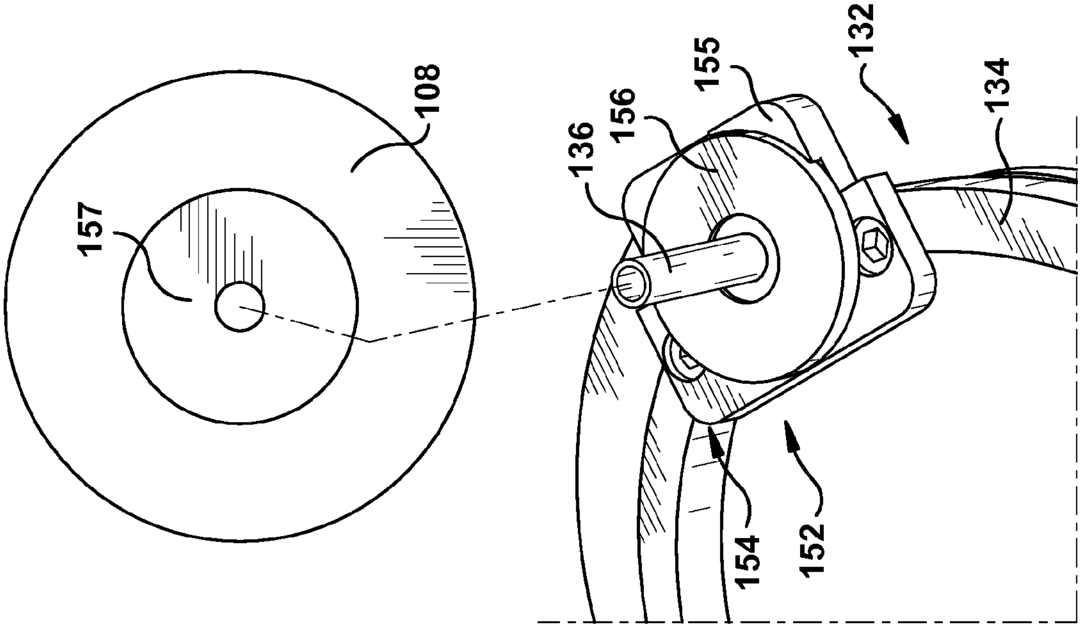
FIG. 8 shows an exploded view of a reel tensioner of the hand-carried taping machine according to embodiments of the invention.

As noted above, tape reel supporting post 136 is coupled to substantially C-shaped mounting plate 134 for rotatably supporting reel of tape 108. FIG. 8 shows an exploded view of tape reel supporting post 136 with reel of tape 108 removed. As shown in FIG. 8, tape reel mount 132 may also include a reel tensioner 152 for providing a rotational tension to tape 109 (FIGS. 6-7) as it deploys from reel of tape 108. Reel tensioner 152 acts to restrict rotation of reel of tape 108 to maintain tension in tape 109 as it is deployed from the reel. Reel tensioner 152 may take any now known or later developed structure capable of restricting free rotation of a reel, e.g., spring-loaded tensioners, friction disks, geared systems, etc. Accordingly, reel tensioner 152 may be located in a variety of positions depending on its structure, e.g., between plate 134 and reel of tape 108, within an axis of reel 108, at an end of reel 108, etc. In the example shown, reel tensioner 152 includes a friction disk system 154 positioned between substantially C-shaped mounting plate 134 and reel of tape 108. In one embodiment, friction disk system 154 includes a disk mount 155 mounted to substantially C-shaped mounting plate 134, e.g., via screws, welding, rivets, etc., from (or through) which post 136 extends. A first friction disk 156 is non-rotatably mounted to disk mount 155 and a complementary second friction disk 157 is non-rotatably mounted to reel 108. First friction disk 156 may include a stone disk capable of restrictive rotation relative to second friction disk 157, which may include a metal, e.g., steel. The position of the different types of disks may be reversed. In operation, reel of tape 108 is mounted on post 136 and held in position thereon by an appropriate retainer 158 (FIG. 1) such that friction disks 156, 157 contact under pressure. In the example shown in FIG. 1, retainer 158 includes a screw and washer arrangement; however, any form of retainer may be provided such as a bolt or any now known or later developed quick release system. In any event, retainer 158 provides sufficient pressure between friction disks 156, 157 such that reel 108 has less friction than metal on metal, but enough friction that reel 108 cannot rotate freely. As such, reel tensioner 152 imposes a slight amount of tension on tape 109 (FIGS. 6-7) as it deploys to maintain a taught condition therein, thus assisting in preventing the tape from folding upon itself, binding in the reel, or otherwise becoming tangled.

In one optional embodiment, shown in FIGS. 1, 3 and 6-7, a tape guide 144 extending parallel to application axis A from tape reel mount 132 (more particular, C-shaped plate 134) may be provided for guiding tape 109 off of reel of tape 108. Tape guide 144 may not be necessary in all instances, but may be advantageous for maintaining an overlap of the tape by keeping the tape flat (the tape may have a tendency to fold over on itself or bind in the reel) and by making it easier for the operator to see where the tape will land on object 101 as reel 108 rotates.

As shown best in FIGS. 1 and 3, non-powered guide system 150 is operably coupled to body 102 for guiding applicator head 120 along elongated object 101 (FIGS. 6-7) with transient engagement with elongated object 101 such that the elongated object is maintained in a vicinity of the reel of tape 108. In other words, guide system 150 prevents undesirable movement of machine 100 relative to object 101 such that the object can be taped in an appropriate fashion. In order to provide this functionality, guide system 150 provides a space 160 through which the object may pass with “transient engagement”. As used herein, “transient engagement” indicates temporary or fleeting contact with object 101 such that the engagement is not permanent and acts to maintain object 101 along application axis A in the vicinity roll of tape 108 as machine 100 moves along object 101. Consequently, it is possible that guide system 150 is out of contact with the object temporarily at some point. It is understood that engagement with object 101 may include engagement with a coating or previous tape layer thereon. Guide system 150 may also assist in supporting the weight of machine 100, as will be described herein. As shown best in FIGS. 1, 3, 6 and 7, space 160 is roughly the same shape as a cross-section of object 101 but is slightly larger so as to allow object 101 to move therethrough as machine 100 moves along the object including along turns therein of varying severity. It is to be understood that guide system 150 (and similarly machine 100 overall) can be sized and shaped to accommodate any size and shape of object 101.

Non-powered guide system 150 may be coupled to body 102 in any now known or later developed fashion. As illustrated in FIGS. 1, 5 and 6, non-powered guide system 150 may be mounted to body 102 by a guide system mount 151. Guide system mount 151 may fixedly position guide system 150 or some level of movement may be provided to allow for ease of insertion of object 101 (FIGS. 6-7) therein.

In accordance with embodiments of the invention, as shown best in FIGS. 1, 3, 6 and 7, guide system 150 may be provided in the form of a number of rollers 172, 174, 176, and/or 178 for transient rolling engagement with elongated object 101. As used herein, “transient rolling engagement” indicates temporary or fleeting rolling engagement of the rollers with object 101 such that the engagement is not permanent and acts to maintain object 101 along application axis A in the vicinity roll of tape 108. As shown best in FIGS. 1, 3, 6 and 7, the rollers are positioned to create space 160 therebetween to roughly accommodate a cross-section of elongated object 101. As shown best in FIGS. 3 and 5, object 101 can be inserted in space 160 when C-shaped gear 130 and C-shaped mounting plate 134 are aligned with opening 104. This position can be attained, for example, by controlled application of power from drive system 114.

In one embodiment, as shown in FIG. 5, guide system 150 may include three rollers 172, 174, 176 for transient rolling engagement with object 101. As noted above, space 160 between the rollers is shaped to roughly match a periphery of the elongated object 101. Rollers 172, 174, 176 are arranged such that contact surfaces thereof to object 101 (FIGS. 6-7) are roughly within a single plane. In this embodiment, space 160 is open to the same side of body 102 as opening 104 (FIG. 1), but is not enclosed by the rollers. Object 101 (FIGS. 6-7) can be inserted in space 160 when C-shaped gear 130 and C-shaped mounting plate 134 are aligned with opening 104 (FIG. 5). In this embodiment, first and second rollers 172, 174 freely rotate about respective first and second axes 182, 184 and third roller 176 freely rotates about a respective third axis 186. First and second axes 182, 184 are substantially perpendicular to third axis 186. In one embodiment, first and second axes 182, 184 may be rotatably coupled to third axis 186, which is in turn positioned by guide system mount 151. However, each axis 182, 184, 186 may be separately positioned, if desired. As illustrated, first and second rollers 172, 174 are substantially cylindrical to accommodate opposing flat faces of object 101 (FIGS. 6 and 7)(e.g., copper end winding) and third roller 176 includes a substantially planar roller that includes an edge (not labeled) that extends between rollers 172, 174 to accommodate an edge of object 101. Other shapes and sizes of rollers are also possible.

In another embodiment, as shown in FIGS. 1, 3, 6 and 7, guide system 150 may include four rollers 172, 174, 176, 178 for transient rolling engagement with object 101. As noted above, space 160 between the rollers is shaped to roughly match a periphery of the elongated object 101. Again, rollers 172, 174, 176, 178 are arranged such that contact surfaces thereof to object 101 (FIGS. 6-7) are roughly within a single plane. In this embodiment, space 160 is closed relative to the side of body 102 having opening 104 (FIG. 1), such that object 101 cannot readily escape space 160 as machine 100 moves along the object. That is, the rollers are arranged such that elongated object 101 is enclosed by the rollers in space 160 therebetween that is shaped to roughly match a periphery of the elongated object. In this embodiment, first and second rollers 172, 174 freely rotate about respective first and second axes 182, 184 and third and fourth rollers 176, 178 freely rotates about a respective third and fourth axes 186, 188. First and second axes 182, 184 are substantially perpendicular to third and fourth axes 186, 188, respectively. In one embodiment, first and second axes 182, 184 may be rotatably coupled to third axis 186, which is in turn positioned by guide system mount 151. However, each axis 182, 184, 186 may be separately positioned, if desired.

As best observed by comparing FIG. 1 with FIG. 3, a pivot 190 may be provided between fourth axis 188 and first axis

182. Pivot 190 is configured to allow pivotal movement of fourth roller 178 (and fourth axis 188) in a direction to allow selective entry of elongated object 101 into space 160. In one embodiment, pivot 190 includes a block (not labeled) rotatable about first axis 182 to which fourth axis 188 is coupled. Other configurations for pivot 190 are possible and considered within the scope of the invention. In one embodiment, as shown in FIG. 1, a spring 192 may be provided to bias pivot 190 to maintain fourth axis 188 in a closed position (shown in FIGS. 6 and 7 with object 101 also). In contrast, FIG. 3 shows an open, pivoted position of fourth roller 188 in which object 101 can be positioned in space 160, i.e., when opening 104 in body 102 and the openings in C-shaped gear 130 and C-shaped plate 134 are aligned sufficiently to allow passing of object 101 therethrough and into space 160. Where spring 192 is provided, fourth axis is biased, e.g., by a user, against the spring to hold the open position. Release of the fourth axis allows it to return to the closed position shown in FIGS. 1, 6 and 7. In the closed position, object 101 is enclosed in space 160, and fourth axis 188 prevents accidental escape of elongated object 101 from space 160. In particular, since pivot 190 allows only selective movement between the open and closed position, and also because pivot 190 does not pivot outwardly toward opening 104, object 101 cannot accidentally escape space 160 during use of taping machine 100. In addition, because object 101 cannot escape space 160 in the closed position, object 101 may support the weight of machine 100 during set up. That is, object 101 may be positioned in space 160, and machine 100 may be allowed to rest on object 101 during set up operations, e.g., installation or replacement of reel 108, placement of an end of tape 109 on object 101, coupling of a power source, positioning of an operator, etc.

As illustrated in FIGS. 1, 6 and 7, first and second rollers 172, 174 may be substantially cylindrical to accommodate opposing flat faces of object 101 (FIGS. 6 and 7)(e.g., copper end winding). In contrast, third and/or fourth roller 176, 178 may be substantially planar such that an edge (not labeled) of each of the third and fourth rollers extend between a periphery of the first and second rollers 172, 174. In this fashion, the edge(s) (not labeled) of rollers 176, 178 may extend between rollers 172, 174 to shape space 160 and accommodate an edge of object 101. Other shapes and sizes of rollers are also possible. Rollers 172, 174, 176, 178 may be made of any suitable rubber or plastic of sufficient toughness to withstand prolonged rubbing along object 101.

Although the non-powered guide system 150 has been described herein as employing rollers, it is understood that other guide surfaces may also be employed with or without rollers. For example, certain rollers may be replaced by fixed guide surfaces.

Figure 9:
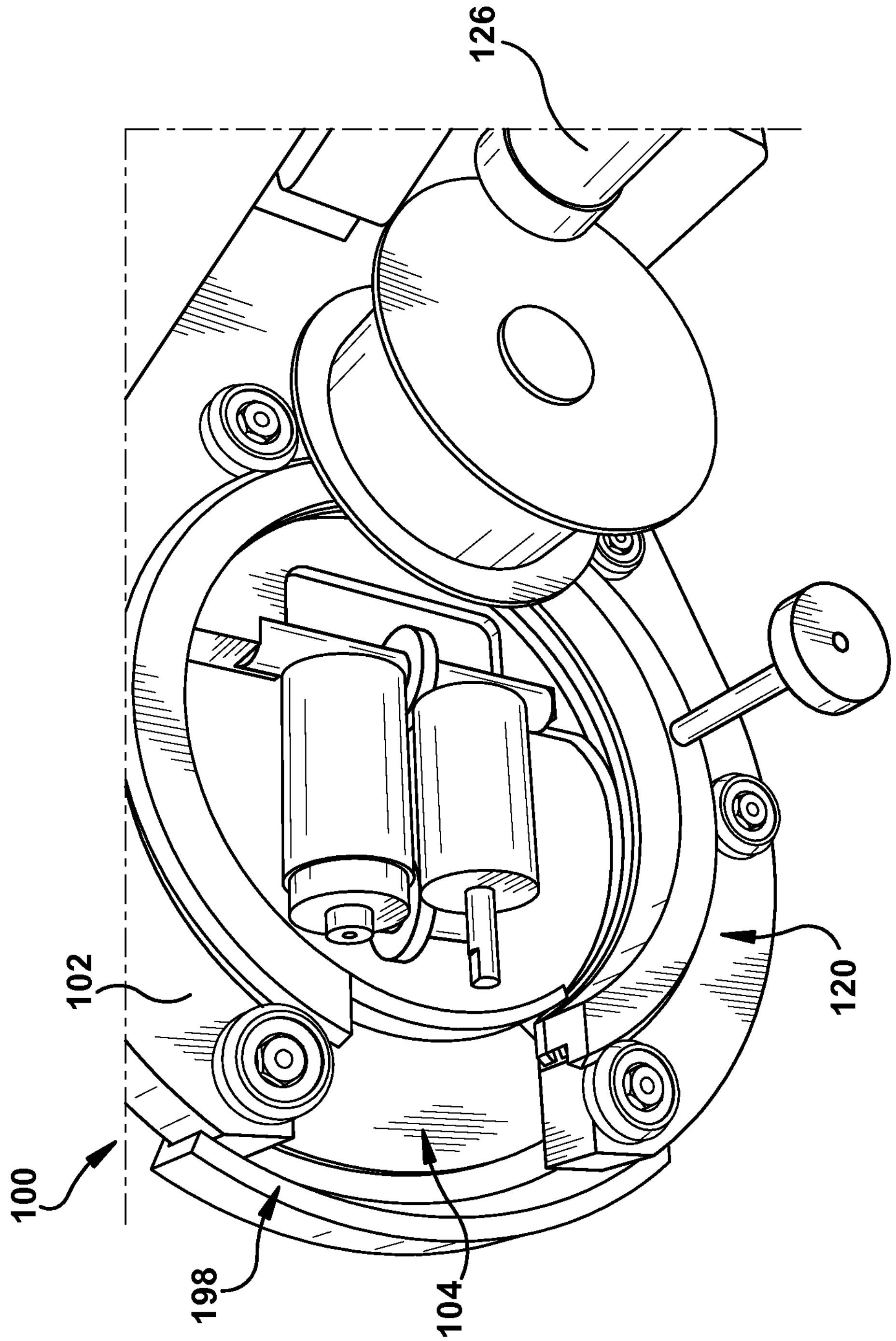
FIG. 9 shows a front perspective view of a hand-carried taping machine with a guard according to embodiments of the invention.

Referring to FIG. 9, in an optional embodiment, applicator head 120 may also include a guard 198 to cover opening 104 in body 102 (applicator head 120) during operation. Guard 198 may include any material capable of resisting movement into opening 104, e.g., metal, hard plastic, etc. In addition, guard 198 may be mounted in any fashion capable of ensuring it substantially prevents an object or operator from entering into contact with rotating applicator head 120 during operation. For example, guard 198 may slide along body 102 and into place or it may be hinged. In either event, guard 198 may be spring loaded to ensure closure thereof over opening 104. Guard 198 may include a single piece of material or multiple parts, as may be necessary.

With reference to FIGS. 3, 5, 6 and 7, operation of hand-carried taping machine 100 will now be described. At set up, as shown in FIGS. 3 and 5, opening 104 in body 102 (applicator head 120) and the openings in C-shaped gear 130 and C-shaped plate 134 are substantially aligned, e.g., by controlled application of power from drive system 114. As shown in FIG. 3, where a fourth roller 178 is provided, fourth axis 188 is pivoted using pivot 190 to the open position. In any event, hand-carried taping machine 100 is slid over elongated object 101 such that elongated object 101 enters space 160. Where fourth roller 178 is provided, fourth axis 188 is returned (perhaps via the bias of spring 192, where provided) to the closed position shown in FIGS. 1, 6 and 7. Where fourth roller 178 is provided, it allows object 101 to support the weight of machine 101 via non-powered guide system 150 such that additional set up of machine 100 can then be carried out, if necessary, without holding machine 100. If no fourth roller 178 is provided, then object 101 is simply positioned in space 160 and an operator must hold machine 100 in place if additional set up is required. Additional set up may include, for example, installing or replacing reel 108, adhering an end of tape 109 to object 101, coupling a power source to drive system 114, an operator positioning himself/herself to comfortably hold handle(s) 124, 126, etc.

FIGS. 6 and 7 show hand-carried taping machine 100 in operation. During operation, powered gear set 112 is powered under control of drive system 114. Powered gear set 112 rotates applicator head 120, via substantially C-shaped gear 130, about application axis A under control of drive system 114. Consequently, tape reel mount 132 rotates about application axis A, as does reel 108. As this occurs, tape 109 is pulled under tension from tensioner 152 from reel 108 onto elongated object 101. Tape 109 may extend over guide 144, if provided. As tape reel mount 132 rotates, an operator moves hand-carried taping machine 100 along elongated object 101 at a pace to ensure a desired positioning and overlap of tape 109, e.g., a half tape width overlap. As this occurs, non-powered guide system 150, being operably coupled to body 102, guides applicator head 120 along elongated object 101 such that the elongated object is maintained in a vicinity of the reel of tape 108. The overlap in tape 109 achieved on object 101 is based on how fast the operator moves machine 100, but guide system 150 contributes to controlling the overlap by constraining machine 100 motion via the transient rolling engagement thereof with object 101. In addition, since non-powered guide system 150 has transient engagement, an operator of hand-carried taping machine 100 can manipulate the machine about a wide variety of turns of different severity in elongated object 101 with ease. For example, FIG. 7 shows machine 100 applying tape 109 to a 90° turn in object 101. Handles 126 may be angled and positioned to allow an operator to hold machine 100 in an ergonomically comfortable and safe manner. Consequently, a relatively consistent desired overlap can be achieved using machine 100. Hand-carried taping machine 100, e.g., applicator head 120 and/or guide system 150, can also be adjusted to vary the tape size for different applications and the cross section of elongated objects 101 to which the tape is applied.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A hand-carried taping machine for taping an elongated object, the hand-carried taping machine comprising:

- a body defining an opening to one side of the body that extends in an outward direction from a closed inner end, wherein an application axis extends generally perpendicular to the outward direction of the opening in the body;
- a powered gear set operably coupled to the body and powered by a drive system;
  - an applicator head including a substantially C-shaped, toothed gear in meshing engagement with the powered gear set such that the substantially C-shaped, toothed gear rotates about the application axis under control of the drive system, and
- a tape reel mount for rotatably mounting a reel of tape on the substantially C-shaped, toothed gear for rotation about the application axis and application of the tape to the elongated object, wherein the tape reel mount includes a substantially C-shaped mounting plate coupled to the substantially C-shaped, toothed gear, the substantially C-shaped mounting plate further including an exposed, radially exterior, substantially circumferentially even bearing surface engaging a roller bearing; and
- a non-powered guide system operably coupled to the body for guiding the applicator head along the elongated object with transient engagement with the elongated object such that the elongated object is maintained in a vicinity of the reel of tape.

2. The hand-carried taping machine of claim 1, wherein the non-powered guide system includes:

- a first roller, a second roller and a third roller for transient rolling engagement with the elongated object.

3. The hand-carried taping machine of claim 2, wherein the first and second rollers freely rotate about respective first and second axes and the third roller freely rotates about a respective third axis, and the first and second axes are substantially perpendicular to the third axis.

4. The hand-carried taping machine of claim 3, wherein the first, second and third rollers form a space therebetween that is shaped to substantially match a periphery of the elongated object.

5. The hand-carried taping machine of claim 2, further comprising a fourth roller for transient rolling engagement with the elongated object.

6. The hand-carried taping machine of claim 5, wherein the first and second rollers freely rotate about respective first and second axes and the third and fourth rollers freely rotate about respective third and fourth axes, and the first and second axes are substantially perpendicular to the third and fourth axes such that the elongated object is enclosed by the rollers in an space therebetween that is shaped to substantially match a periphery of the elongated object.

7. The hand-carried taping machine of claim 6, further comprising a pivot between the fourth axis and the first axis configured to allow pivotal movement of the fourth roller to allow selective entry of the elongated object into the opening in an open, pivoted position and preventing escape of the elongated object in a closed position.

8. The hand-carried taping machine of claim 7, further comprising a spring to load the pivot to maintain the fourth axis in the closed position, and wherein the elongated object supports the weight of the hand-carried taping machine in the closed position.

9. The hand-carried taping machine of claim 6, wherein an edge of each of the third and fourth rollers extends between a periphery of the first and second rollers.

10. The hand-carried taping machine of claim 1, wherein the drive system provides a first handle for an operator, and further comprising at least one second handle extending at an angle relative to the first handle.

11. The hand-carried taping machine of claim 1, wherein the tape reel mount includes a tape reel supporting post coupled to the substantially C-shaped mounting plate.

12. The hand-carried taping machine of claim 9, wherein the roller bearing further includes a plurality of rolling bearings mounted to the body about the opening of the body, wherein the exposed, radially exterior, substantially circumferentially even bearing surface of the substantially C-shaped mounting plate engages the plurality of rolling bearings.

13. The hand-carried taping machine of claim 11, wherein the tape reel mount further includes a reel tensioner for restricting rotation of the reel of tape so as to apply tension to the tape as the tape deploys from the reel of tape.

14. The hand-carried taping machine of claim 1, further comprising a tape guide extending parallel to the application axis from the tape reel mount for guiding the tape off of the reel of tape.

15. A hand-carried taping machine for taping an elongated object, the hand-carried taping machine comprising:

- a body defining an opening to one side of the body that extends in an outward direction from a closed inner end, wherein an application axis extends generally perpendicular to the outward direction of the opening in the body;
- a powered gear set operably coupled to the body and powered by a drive system;
- an applicator head including:
  - a substantially C-shaped, toothed gear in meshing engagement with the powered gear set such that the substantially C-shaped, toothed gear rotates about the application axis under control of the drive system,
  - a tape reel mount for rotatably mounting a reel of tape on the substantially C-shaped, toothed gear for rotation about the application axis and application of the tape to the elongated object, wherein the tape reel mount includes a substantially C-shaped mounting plate coupled to the substantially C-shaped, toothed gear, the substantially C-shaped mounting plate further including an exposed, radially exterior, substantially circumferentially even bearing surface;
- a plurality of rolling bearings mounted to the body about the opening in the body, wherein the exposed, radially exterior, substantially circumferentially even bearing surface of the substantially C-shaped mounting plate engages at least one of the plurality of rolling bearings; and
- a non-powered guide system operably coupled to the body for guiding the applicator head along the elongated object with transient engagement with the elongated object such that the elongated objected is maintained in a vicinity of the reel of tape.

16. The hand-carried taping machine of claim 15, wherein the non-powered guide system includes a plurality of rollers for transient rolling engagement with the elongated object.

17. A hand-carried taping machine for taping an elongated object, the hand-carried taping machine comprising:

a body defining an opening to one side of the body that extends in an outward direction from a closed inner end, wherein an application axis extends generally perpendicular to the outward direction of the opening in the body;

a powered gear set operably coupled to the body and powered by a drive system;

an applicator head including:

a substantially C-shaped, toothed gear in meshing engagement with the powered gear set such that the substantially C-shaped, toothed gear rotates about the application axis under control of the drive system, and a tape reel mount for rotatably mounting a reel of tape on the substantially C-shaped, toothed gear for rotation about the application axis and application of the tape to the elongated object, wherein the tape reel mount includes a substantially C-shaped mounting plate coupled to the substantially C-shaped, toothed gear, the substantially C-shaped mounting plate further including an exposed, radially exterior, substantially circumferentially even bearing surface engaged with a bearing; and a non-powered guide system operably coupled to the body, the non-powered guide system including a plurality of rollers for transient rolling engagement with the elongated object for guiding the applicator head along the elongated object with transient engagement with the elongated object such that the elongated object is maintained in a vicinity of the reel of tape.

18. The hand-carried taping machine of claim 17, wherein each of the plurality of rollers freely rotate about their respective axes.

19. The hand-carried taping machine of claim 17, wherein the plurality of rollers enclose the elongated object.

20. The hand-carried taping machine of claim 17, wherein the bearing includes a plurality of rolling bearings mounted to the body about the opening in the body, wherein the exposed, radially exterior, substantially circumferentially even bearing surface of the substantially C-shaped mounting plate engages the plurality of rolling bearings.

* * * * *